United States Patent [19]

Warner

[11] Patent Number: 4,852,344

[45] Date of Patent: Aug. 1, 1989

[54] WASTE DISPOSAL METHOD AND APPARATUS

[75] Inventor: Donald F. Warner, Speculator, N.Y.

[73] Assignee: Energy Economics & Development, Inc., Speculator, N.Y.

[21] Appl. No.: 202,560

[22] Filed: Jun. 6, 1988

[51] Int. Cl.⁴ ............................ F02C 6/00; F02G 3/00
[52] U.S. Cl. .................................. 60/39.182; 60/648; 60/39.07
[58] Field of Search .................. 60/39.07, 39.182, 648, 60/39.181, 39.183

[56] References Cited

U.S. PATENT DOCUMENTS

| | | | |
|---|---|---|---|
| 3,965,362 | 6/1976 | Harvey | 60/648 X |
| 4,146,361 | 3/1979 | Cirrito | 60/39.07 X |
| 4,160,362 | 7/1979 | Martens et al. | 60/39.182 |
| 4,257,223 | 3/1981 | Enga | 60/39.182 X |
| 4,414,813 | 11/1983 | Knapp | 60/39.182 X |

*Primary Examiner*—Allen M. Ostrager
*Attorney, Agent, or Firm*—Richard G. Stephens

[57] ABSTRACT

The economics of waste disposal are markedly improved by combining a waste-burning plant with a gas turbine-generator set, with exhaust gas from the gas turbine fed as combustion air into a waste-burning incinerator. A boiler associated with the waste-burning incinerator supplies steam to operate a steam turbine and a second electric generator.

12 Claims, 4 Drawing Sheets

WASTE DISPOSAL METHOD AND APPARATUS

My invention relates to method and apparatus for burning municipal solid waste ("MSW"). Plants which burn municipal solid waste, and which produce steam or electric energy as the end product thereof, are well known and used in many municipalities. A typical contemporary plant serving a population of 300,000 people might burn an average of 500 tons of waste per day and produce approximately 10 megawatts of net plant electrical power (terminal minus auxiliaries), based on steam conditions of 650 psig and 750° F. This efficiency can be increased by about 8-10% as the plant size approaches 50 megawatts, reflecting the higher efficiency inherent in larger steam turbines. An additional increase, in the order of 8%, can be realized at steam conditions of about 1000 psig and 840° F; but excessive high temperature corrosion of boiler surfaces will result at higher pressure and temperature conditions due to acids formed by the refuse's constituents, especially polyvinyl chlorides.

The prior art is also exemplified by U.S. Pat. No. 4,321,151, issued Mar. 23, 1982 to Frederick G. McMullen. This patent shows a waste-to-energy conversion system in which waste material is combusted to generate steam and combustible gas, and other by-products. The gas may be used to drive a heat engine such as a gas turbine, with the turbine exhaust fed back to the combustor, to support the combustion process. There is no showing or suggestion that a gas turbine, generator fueled independently, should have its exhaust used for combustion air in a waste-heat boiler, which generates steam to drive a steam turbine-generator set, thereby increasing the efficiency of the overall combination.

General objects of the present invention are to provide method and apparatus for the burning of MSW which are economically more attractive than those used in typical contemporary MSW-fueled plants. Such contemporary waste-power plants, especially those having waste-burning capabilities of 500-1000 tons per day (TPD) or less, have relatively small power capability (output), and, consequently, have inherently high cost per net plant power output.

Various costs associated with putting an MSW plant into operation tend to vary little with the capacity of a plant. The legal cost associated with obtaining necessary permits is one example. Certain operating costs also tend to vary little with the capacity of a plant. The general and administrative expense and the number of people required to operate the plant are about the same for an MSW plant which burns 250 tons per day (TPD) as they are for a plant which burns 1000 TPD. Because of such factors, as the capacity of a proposed plant decreases, a point eventually is reached at which the plant is deemed economically impractical. Sometimes groups of municipalities, such as several counties, have banded together to promote a joint waste-burning installation, to develop enough tonnage for a cost effective operation. While such joint efforts may be practical in some instances, the added cost of longer hauling distances offsets some of the savings obtained by operation with a greater burning capacity. What is crucially needed are waste-burning method and apparatus which can be economically operated at much lower capacities, such as 100 to 500 tons per day, and provision of such method and apparatus is one object of the present invention. It is vitally important to note, however, that use of the principles of the present invention is by no means restricted to small-capacity waste disposal plants, and that use of the method and apparatus of the present invention can decidedly increase the economic viability and efficiency of both medium-capacity and large-capacity waste burning plants.

In accordance with one important concept of the invention, the incinerator of a waste-burning plant is connected to receive hot exhaust from a gas turbine which drives a first electric generator, so that the heat delivered by the incinerator includes heat from the gas turbine exhaust as well as heat generated by the burning of MSW. It is important to note that the use of the gas turbine exhaust gases in the MSW combustion process increases the utilization of MSW heat by approximately 10%, compared to usual processor, reflecting the virtual elimination of the ambient combustion air required in normal MSW combustion, and the associated sensible heat lost in the high temperature stack gases. The heat output of the incinerator is applied to a boiler, and the steam from the boiler drives a steam turbine which, in turn, drives a second electric generator. The boiler and the second generator are, of course, much larger than that associated with normal MSW combustion, reflecting the combined effects of the sensible heat in the gas turbine exhaust, elimination of the hot gas loss associated with normal MSW combustion and also the higher steam turbine efficiency inherent in larger-sized machines. With such an arrangement the cost per steam turbine kilowatt from recovered MSW heat is significantly less than that associated with a smaller steam turbine plant which produces steam made solely from burning MSW. That reduction in cost occurs in part by reason of the effect of power generation equipment size on the cost of equipment, engineering, operation, maintenance, and various other costs. An increase in steam plant size reduces the per kilowatt cost, and thus increasing the steam plant size so that it handles gas turbine exhaust as well as the usual heat generated from burning MSW results in a reduced cost per kilowatt. Thus one object of the invention is to provide a more efficient MSW burning system having an associated gas turbine which provides additional heat to the heat recovery steam system associated with the MSW burning system.

The amount of MSW which will be delivered to an MSW-plant may vary rather widely. Another object of the invention is to provide MSW-burning method and apparatus which can operate economically despite wide swings in the amount of MSW the plant is required to process.

Another object of the invention is to provide an ability to reduce a portion of the nitrogen oxide which is entrained in the gas turbine exhaust utilized in the waste combustion system.

Other objects of the invention will in part be obvious and will in part appear hereinafter.

The invention accordingly comprises the several steps and the relation of one or more of such steps with respect to each of the others, and the apparatus embodying features of construction, combination(s) of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

In the following description, wherein comparisons are made between systems of the present invention and prior art systems, calculations are based on an assumption of a typical municipal waste having a high heat value of 4700 BTU per lb., and the following composition, by weight:

| C | 24.9% | $H_2$ | 3.0% | S | 0.1% |
|---|---|---|---|---|---|
| $O_2$ | 20.9% | $N_2$ | 1.3% | $H_2O$ | 27.8% |
| Ash | 22.1% | | | | |

Using the above values and assuming delivery of a given quantity of MSW, it is then possible to use tables and formulas as found in Chapter 6 of the book "Steam", published by Babcock and Wilcox, to calculate the quantities of combustion air required, the steam output at given procedures and temperatures, the electric power output, and other system parameters. Examples of such calculations are set forth in the following descriptions.

Figure 1:
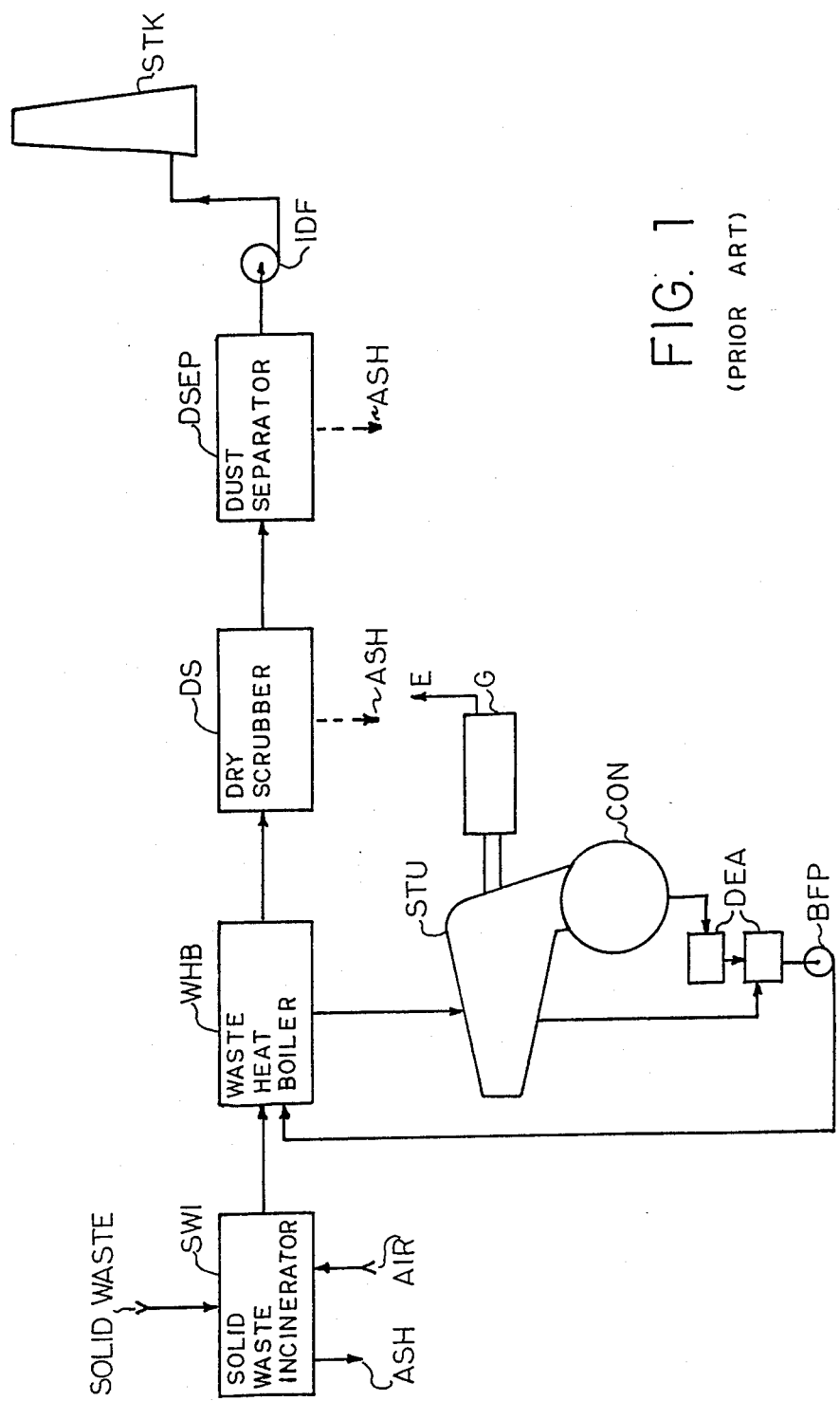
FIG. 1 is a block diagram illustrating a typical prior art MSW burning system.

In the conventional prior art waste-burning operation depicted in FIG. 1, 41,667 pounds per hour (PPH) or 500 TPD of MSW, which amounts to 195.83 million BTU per hour, are delivered to solid waste incinerator SWI, which also receives 242,460 PPH of ambient combustion air, providing 100% excess air, as is typical of MSW combustion systems. Combustion of the MSW will provide 274,920 PPH of combustion products at 2044° F., or 135.8 million BTU per hour for steam generation, representing a 69.4% conversion of the HHV heat contained in the 500 TPD of MSW. In FIG. 1 the combustion products from incinerator SWI are shown supplied to waste heat boiler WHB, which is shown as a separate block, or unit. It is well known, however, to supply MSW to a single unit, such as a water-wall boiler having a traveling grate, so the functions performed by blocks SWI and WHB can be performed within a single structure. In FIG. 1 boiler WHB provides 116,550 PPH of 685 psig/755F. steam to permit turbine throttle conditions of 650 psig/750F. The steam from boiler WHB is shown supplied to steam turbine STU, which drives electric generator G. The electric generator G provides an output of 11,640 kilowatts. The exhaust gas from boiler WHB (eg., 274,920 PPH at 350° F.) is shown supplied to conventional pollution treatment apparatus, including a conventional dry scrubber DS, a conventional dust separator DSEP, which typically may comprise a bag house or an electronic precipitator, and thence via an induced-draft fan IDF to a stack STK. Condensate from the steam turbine STU is fed to a deaerator DEA, and then via boiler feed pump BFP, it is returned to boiler WHB.

Figure 2:
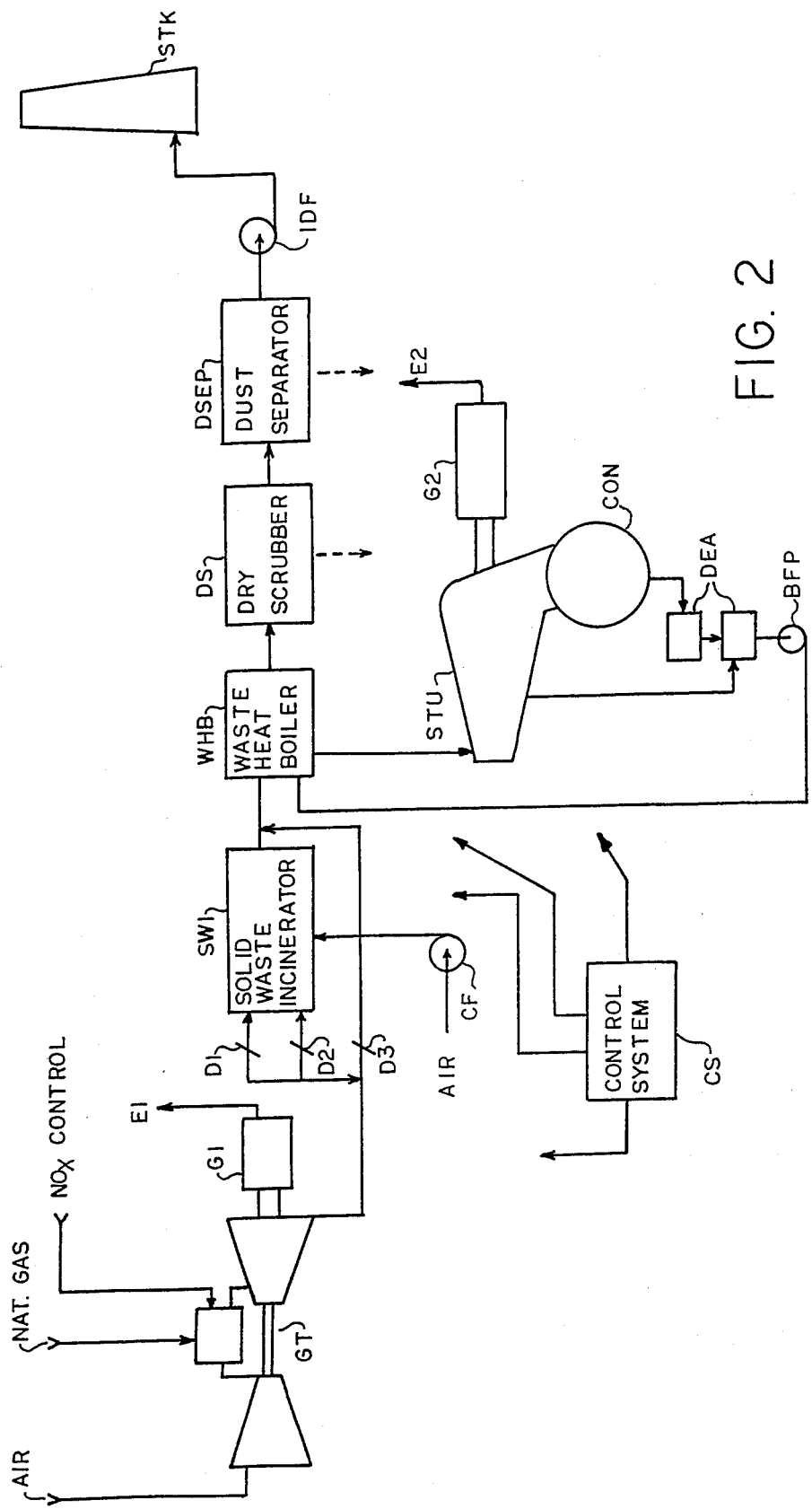
FIG. 2 is a block diagram showing a preferred embodiment of the present invention.

FIG. 2 shows an MSW-burning plant, a portion of which is functionally similar to the prior art plant of FIG. 1 in a block-diagram sense. The values of typical operating conditions described for FIG. 1 are again assumed for FIG. 2, including consumption of 500 TPD of MSW. An incinerator SWI which burns MSW supplies heat to a waste heat boiler B, which furnishes steam to drive steam turbine STU and electric generator G2.

The incinerator and boiler may be a combination unit, such as, for example, those furnished by the Riley Stoker Corporation of Worcester, MA. It should be noted that the equipment can be so designed and built that it can accept alternate fuels other than MSW, such as, for example, hazardous waste, wood chips, tree bark, and other forms of bio-mass. The stoker portion of the combination may be of the reciprocatory grate type, such as, for example, those supplied by the Detroit Stoker Company of Monroe, Mich. The steam turbine STU and electric generator G2 may be any of well-known units of this type, such as those manufactured by General Electric Co., Schenectady, New York, or Westinghouse Electric Corporation, East Pittsburgh, PA. Other elements are all well known in the heat power engineering field, and are readily available from a number of suppliers.

It should be noted that the arrangement shown in FIG. 2, according to a preferred embodiment of the invention, provides substantially more gas volume and heat to the waste heat boiler B than what are provided to the prior art boiler of FIG. 1. Generator G2 consequently produces substantially more electric power than generator G of the prior art system. In order to use the larger gas volume and greater heat to produce more electric power, the incinerator, boiler, steam turbine, and generator of FIG. 2 are larger than their counterparts of FIG. 1, and consequently more cost effective, as previously discussed.

The larger gas volume and greater heat supplied to the boiler B of FIG. 2 result from hot exhaust gas, as well as some ambient air, being supplied to the solid waste incinerator SW. In FIG. 2 the hot exhaust gas from a gas turbine GT is shown applied to incinerator SWI, via plural paths. Some of the gas turbine exhaust is shown by-passing the incinerator SWI to mix with the output of the incinerator to supply boiler B. The exhaust gas from turbine GT may be supplied to several different combustion zones of the incinerator. The proportions of the gas applied to the various zones and the amount by-passed are shown controlled by dampers D1, D2 and D3.

The gas turbine GT is assumed, for example, as receiving 19,480 PPH of fuel, receiving 1,088,460 PPH of air at ambient (59F) temperature, producing 38,700 kw of electric power via the connected generator G1, and producing 1,107,940 PPH of exhaust gas at 1009 F. 840,440 PPH of exhaust gas at 1009 F is assumed to bypass the incinerator SW. 360,140 PPH of gas at 2169 F from the incinerator mixes with the by-passed gas, so as to supply a net of 1,200,580 PPH of gas at 1,384 F to boiler B. Boiler B receives 294,940 PPH of feedwater at 244 F and provides 291,050 PPH of steam at 685 psig and 755F. Exhaust steam from turbine STU is condensed by conventional condensor CON. A conventional deaerator and a boiler feed pump are shown at DEA and BFP, respectively. In FIG. 2 boiler B provides 291,050 PPH of 685 psig/755F steam to permit turbine STU throttle conditions of 650 psig/750F. The steam from boiler B is shown supplied to steam turbine STU which drives electric generator G2. The electric generator G2 provides an output of 28,490 kilowatts. It is important to note that the additional steam turbine output in FIG. 2 increases the kilowatt output of generator G2 by a substantial percentage as compared with the kilowatt output of generator G in FIG. 1.

The gas turbine GT may comprise any of a number of commercially-available types, such as a model MS-6001 available from General Electric Company, Greenville, South Carolina or a model Centaur T-4500 turbine made by Solar Turbines, Inc., San Diego, Calif. A gas turbine typically includes compressor, combustor, and turbine expansion sections, as shown. In FIG. 1 ambient air is compressed in the compressor section with a temperature rise of the order of 500–600 deg. F. Natural gas, or No. 2 fuel oil, or a similar distillate is supplied to fuel the combustor section of the gas turbine, to raise the gas temperature to about 2000 deg. F, and that high temperature gas is then expanded in the turbine, which drives both the compressor and the associated generator G1.

Nitrogen oxides ($NO_x$) are generated in the gas turbine combustion process and are contained in the gas turbine exhaust gases flowing to the waste combustion system. This pollutant is normally controlled to environmentally acceptable levels by the injection of steam or water into the combustor section of the gas turbine, with an associated decrease in gas turbine efficiency. In a system according to the present invention, since the oxygen in the $NO_x$-bearing exhaust gas supports the waste combustion process, a portion of the entrained $NO_x$ will be destroyed. This action will enable a reduction in the quantity of water or steam to the compressor, with an associated improvement in gas turbine efficiency. Thus another objective of this invention is to attain acceptable emission levels at improved levels of plant efficiency.

An improvement in the MSW combustion process is another objective of this invention. A typical contemporary MSW-fired plant utilizes relatively low temperature air in the fuel-drying and fuel-burning sections of its combustor, and in order to attain a satisfactory burnout of combustibles in the waste, 75% to 125% excess air is usually required. The use of high temperature gas turbine exhaust gases in accordance with the invention greatly enhances both the fuel drying and the combustible's suitability for combustion, with an expected reduction in the level of excess air needed for satisfactory burnout of combustibles; such a reduction in excess air results in a corresponding reduction in combustion losses.

Contemporary MSW-fired plants generate polychlorinated dibenzo-p-dioxins (PCDD's) and polychlorinated dibenzofurans (PCDFs) which are emitted to the atmosphere. The level of these emissions and the operating characteristics that affect their generation were investigated at the Vicon Incinerator Facility in Pittsfield, Mass., and are documented in the Final Report: "Results of the Combustion and Research Project at the Vicon Incinerator Facility in Pittsfield, Massachusetts", prepared by Midwest Research Institute, Kansas City, Mo. The result shows that the incinerator operating temperature affects the levels of PCDDs and PCDFs, wherein significantly lower levels are attained at higher combustion temperatures. The use of high temperature exhaust gases in accordance with this invention permits higher combustion temperatures than those in contemporary MSW-fired systems, especially at the lower levels of excess air as previously described.

For the systems pertaining to this invention, the damper arrangement and operation enables the combustor to be operated in an optimum manner with respect to minimizing excess air with satisfactory burnout of combustibles, and consequently, minimizing combustion losses and emissions. Dampers D1, D2 and D3, FIG. 2, perform two functions, as follows: first, as a function of their combined resistance to flow to the combustion process, the required amount of bypassed gas is attained; and second, the required distribution of combustion gases to the drying and combustion zones is attained. In the event that more than two (2) points of admission to the combustion process are required, additional distribution dampers would be provided as necessary. These would act in the same mode as a two damper system, wherein their combined resistance would regulate the by-passed gas, and their relative resistance would regulate the flows to the combustion zones, as required.

The various elements of the system are all controlled by a control system CS indicated generally in the drawing.

A distributed digital control system can be utilized, which may include, if desired, programmable controllers. Such a control system can be furnished by one of the following: Bailey's Network 90; Fisher's PROVOX; Honeywell's TDC-3000; Foxboro's Intelligent Automation and others.

Figure 3:
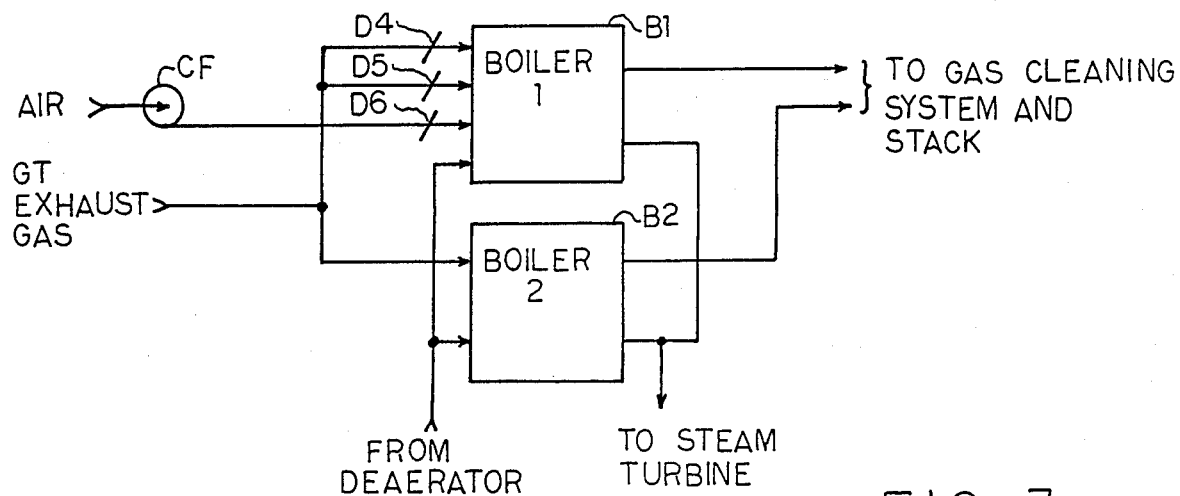
FIG. 3 is a block diagram illustrating a first alternative arrangement according to the invention.

FIG. 3 is a fragmentary diagram of a modification of the system shown in FIG. 2, in which two boilers, B1, B2 are utilized. The hot turbine exhaust is supplied to various zones in B1 by operation of the dampers D4 and D5, while damper D6 controls the additional combustion air supplied by charging fan CF. No distribution of the exhaust gas is provided for boiler B2. The steam outputs from both boilers are combined and fed to the steam turbine. Boiler feed water is supplied to the boilers from the deaerator.

Figure 4:
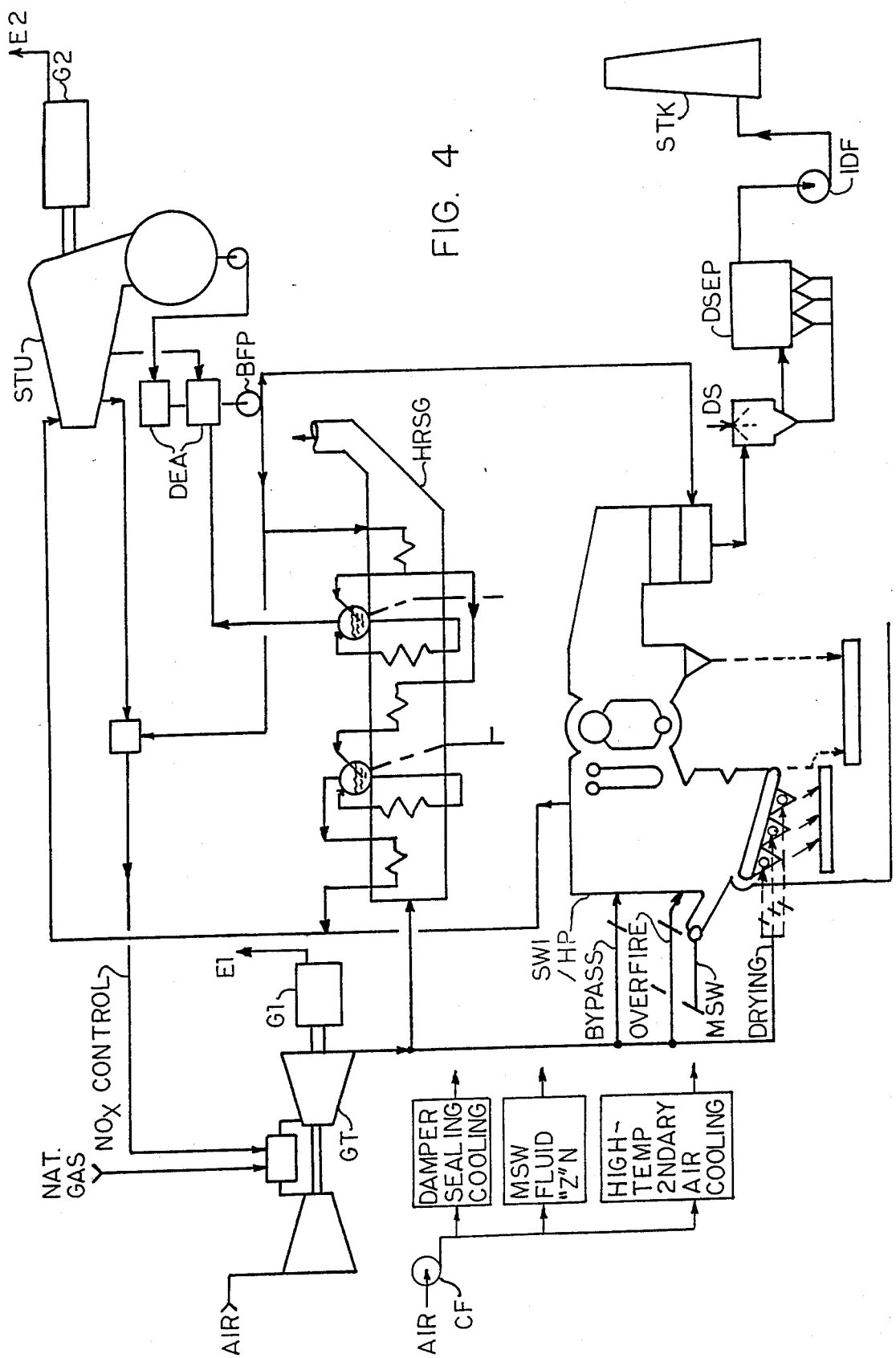
FIG. 4 is a block diagram illustrating a second alternative arrangement according to the invention.
Figure 2:
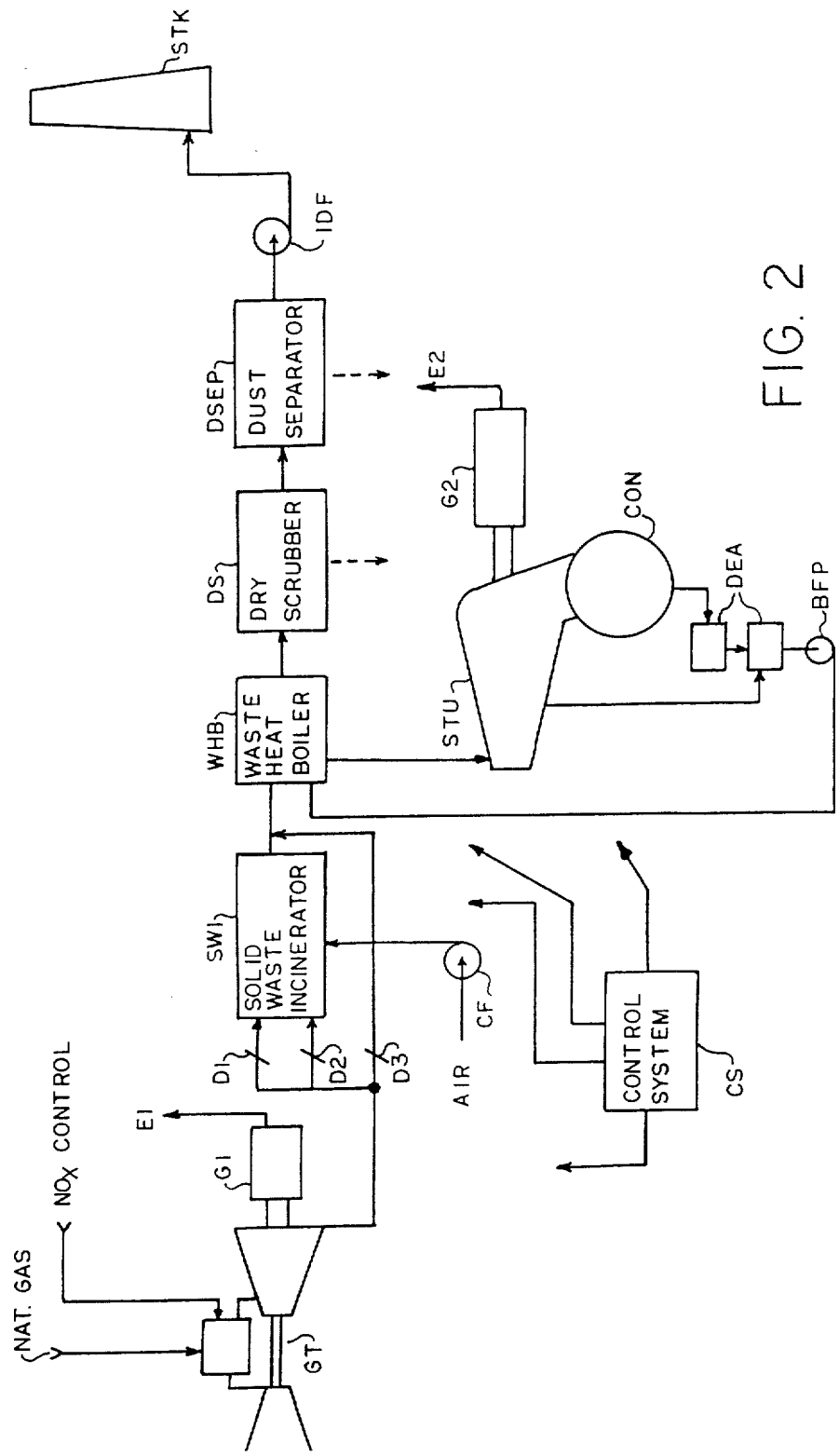

FIG. 4 is a block diagram of a further modification of FIG. 2, in which a portion of the hot exhaust gas is supplied to a heat recovery steam generator ("HRSG") which uses by-pass gas to provide superheated steam to the turbine in addition to the steam supplied by the incinerator-boiler combination SWI/B. The various elements and their operation are similar to those already described. Higher steam temperature permits correspondingly higher throttle pressure without consequential water erosion problems in the steam turbines low pressure stages. Better throttle conditions result in improved overall plant performance. In FIG. 4 the excess gas turbine exhaust gas from turbine GT is utilized in a conventional heat recovery steam boiler HRSG (with or without duct firing) and the MSW is burned in a conventional water-wall boiler shown at HP. The configuration of FIG. 4 has the same benefits of improved combustion efficiency, improved boiler efficiency, improved pollution control, and reduced costs per MSW-generated steam turbine kw due to the larger steam turbine system as in the case of FIG. 2. In FIG. 4 it is shown that a charging fan CF may supply ambient air for use in sealing and cooling dampers, and providing some high temperature secondary air cooling, if desired. In a typical system in accordance with the invention some gas turbine exhaust will be supplied under an incinerator grate along with ambient air to limit the grate temperature to 400° F., for example, and another portion, or perhaps the entire remaining portion of the gas turbine exhaust gas will be supplied to the secondary combustion zone in order to elevate those combustion temperatures to approximately 2100°–2500° F. Such elevated temperatures are desirable in order to provide complete "burnout" of contaminants carried in MSW.

Figure 5:
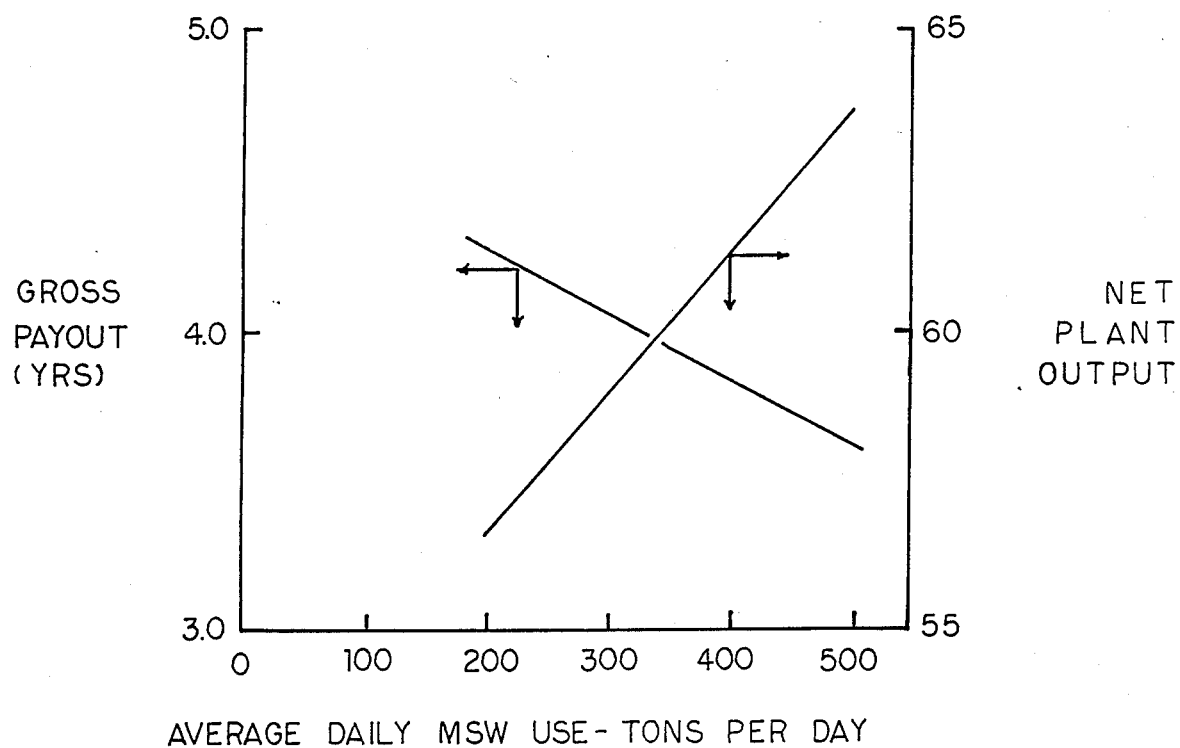
FIG. 5 is a graph showing net plant output and gross payout versus average daily MSW use (TPD).

FIG. 5 is a graph showing plots of net plant output for FIG. 2 and gross payout versus daily MSW use in tons per day, for a plant designed for 500 TPD. At other, lower usage rates the system is underloaded with respect to its MSW burnup capability. Consequently, the net plant output drops off and the GPO increases, although at a low rate due to the high proportion of gas turbine power which remains fixed. This demonstrates the relatively low sensitivity of the system's economics to the MSW's usage, an important advantage for the system.

From all of the foregoing, it will be apparent that my invention provides a novel arrangement in which hot exhaust gases from a gas turbine-generator set, fueled from an external source, are supplied to a solid waste incinerator, as combustion air. The heat developed by the incinerator generates steam which is used to drive a steam turbine generator set. The combination provides an efficient way to increase the generating capacity of a combined cycle plant.

Although I have herein shown and described only a few embodiments of my invention, it will be apparent to those skilled in the art that various modifications and changes may be made therein, within the scope of the appended claims, without departing from the spirit and scope of my invention.

While single incinerator systems have been described above it is within the scope of the invention to utilize plural incinerator systems and selectively direct the gas turbine exhaust gas to one or more of them allowing incinerators to be shut down periodically for maintenance, if desired. The induced draft fan IDF in FIG. 2 insures, of course, that there is no back pressure applied to the gas turbine, as well as providing balanced system gas flow.

Having thus described my invention, what I claim is:

1. A waste-burning plant, comprising, in combination:
   a gas turbine generation means which includes a gas turbine and a first electric generator mechanically connected to be driven by said gas turbine;
   a waste-burning incinerator; a boiler, said incinerator being connected to receive at least a portion of the exhaust from said gas turbine as combustion air, to receive a waste, to burn said waste and to supply heat to said boiler to generate steam;
   a steam turbine and a second electric generator, said steam turbine being connected to receive steam from said boiler and connected to drive said second electric generator.

2. A waste-burning plant as claimed in claim 1 wherein said boiler is connected to receive all of the exhaust from said gas turbine.

3. A waste-burning plant as claimed in claim 1, further characterized by said incinerator being capable of burning alternative fuels.

4. A waste-burning plant as claimed in claim 3, further characterized by said alternative fuels including the class comprised of coal, wood chips, tree bark and hazardous wastes.

5. A waste-burning plant as claimed in claim 1, further characterized by said incinerator and said boiler comprising a combined structure.

6. In a combined cycle power generation system having an externally-fueled gas turbine driving a first electrical generator, a boiler receiving exhaust from said gas turbine and producing steam, a steam turbine driven by said steam and a second electrical generator driven by said steam turbine, the improvement which comprises: a waste-burning incinerator connected to receive at least a portion of the exhaust gas from said gas turbine as combustion air and to receive a waste fuel, and connected to supply heat to said boiler.

7. The system of claim 6 wherein said waste fuel comprises municipal solid waste.

8. The system of claim 6, further characterized by said waste-burning incinerator receiving alternative fuels, from the class comprising coal, wood chips, tree bark, and hazardous wastes.

9. The method of disposing of municipal solid wastes comprising the steps of:
   feeding said wastes to a waste-burning incinerator, generating steam by combusting said wastes in said incinerator, generating electric power by supplying said steam to a steam turbine-generator set and supplying hot exhaust gas from a gas turbine-generator set to provide combustion air to said incinerator.

10. The method of disposing of municipal solid wastes as claimed in claim 9, comprising the further step of supplying a portion of the hot exhaust gas directly to said boiler.

11. The method of disposing of municipal solid wastes as claimed in claim 9, in which alternative solid fuels are supplied to said incinerator to supplement the municipal solid waste fuel.

12. The method of disposing of municipal solid wastes as claimed in claim 9, in which all of said hot exhaust gas is supplied to said waste-burning incinerator.

* * * * *

UNITED STATES PATENT AND TRADEMARK OFFICE
CERTIFICATE OF CORRECTION

PATENT NO. : 4,852,344

DATED : 08/01/1989

INVENTOR(S) : Donald F. Warner

It is certified that error appears in the above-identified patent and that said Letters Patent is hereby corrected as shown below:

Fig. 2 of the drawings should be added as shown on the attached sheet.

Signed and Sealed this

Thirty-first Day of July, 1990

Attest:

HARRY F. MANBECK, JR.

*Attesting Officer*     *Commissioner of Patents and Trademarks*